United States Patent Office 2,822,412
Patented Feb. 4, 1958

2,822,412

USE OF ACYL THIOUREAS IN RUBBER

Joseph C. Ambelang, Akron, Ohio, assignor to The Firestone Tire & Rubber Company, Akron, Ohio, a corporation of Ohio No Drawing. Application October 15, 1954
Serial No. 462,621

13 Claims. (Cl. 260—801)

This invention relates to the use in vulcanized rubber compositions of a thiourea derivative of the formula

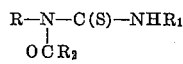

in which R and $R_1$ are the same or different alkyl groups containing up to nine carbon atoms or cyclopentyl, cyclohexyl, alkyl-substituted cyclopentyl and alkyl-substituted cyclohexyl groups, and in which $R_2$ is an alkyl group of 1 to 5 carbon atoms.

The rubber compositions can be those used in tires, inner tubes, rubber thread, and other products produced from rubber latexes, and other rubber articles. The compositions consist essentially of natural rubber, or a sulfur-vulcanizable synthetic rubber, as for example, a polymer of butadiene or an alkyl derivative thereof, or a copolymer of butadiene or an alkyl derivative thereof, or a copolymer of butadiene or an alkyl derivative thereof with a vinyl monomer, or a mixture of sulfur-vulcanizable rubbers.

The deterioration of rubber is due to different factors and is evidenced in various ways.

Although generally the acetyl disubstituted thioureas will be employed, because more readily obtainable commercially, the formyl, propionyl, butyryl, and valeryl derivatives can be employed. The disubstituted thioureas from which the antiozone agents of this invention are obtainable include, for example:

N,N'-dimethyl thiourea
N,N'-diethyl thiourea
N,N'-di-n-propyl thiourea
N,N'-di-i-propyl thiourea
N,N'-di-n-butyl thiourea
N,N'-di-t-butyl thiourea
N,N'-di-i-butyl thiourea
N,N'-di-tt-octyl thiourea
N-n-pentyl-N'-n-nonyl thiourea
N-n-hexyl-N'-n-heptyl thiourea
N,N'-dicyclohexyl thiourea The following is illustrative of the preparation of the acyl thioureas useful in carrying out the invention:

ACETYL N,N'-DI-i-PROPYL THIOUREA

One mole of N,N'-di-i-propyl thiourea was suspended in benzene and shaken while 1.1 mole of acetyl chloride was dropped in. Next was added 1.1 mole of pyridine. Water was then added to dissolve the pyridine hydrochloride. The benzene layer was washed with water and sodium bicarbonate solution. The acetyl thiourea crystallized out on spontaneous evaporation of the benzene. After recrystallization from hexane, the product melted at 120–121° C. (corrected).

Analysis

|   | Calc. for $C_9H_{18}ON_2S$ | Found |
|---|---|---|
| S | 15.85 | 15.78, 16.02 |
| N | 13.88 | 13.94, 14.02 |
| C | 53.4 | 53.68, 53.48 |
| H | 8.9 | 8.85, 9.02 |

The melting points (corrected) and analyses for nitrogen (Kjeldahl) and sulfur (Carius) for a number of compounds prepared according to the forgoing general procedure are given in the following table:

| Compound | M. P., °C. | Analysis | | | |
|---|---|---|---|---|---|
| | | Nitrogen | | Sulfur | |
| | | Calc. | Found | Calc. | Found |
| Acetyl dimethylthiourea | 85– 86.5 | 19.16 | 18.48, 18.40 | 21.93 | 21.67, 21.75 |
| Acetyl dicyclohexylthiourea | 171–171.5 | 9.92 | 9.85, 9.82 | 11.35 | 11.19, 11.35 |
| Butyryl di-i-propylthiourea | 103–104 | 12.16 | 11.94, 12.02 | 13.92 | 13.75, 13.85 |
| Propionyl-di-i-propylthiourea | 139–141 | 12.95 | 12.91, 13.11 | 14.82 | 14.67, 14.68 |
| i-Valeryl di-i-propylthiourea | 83– 84 | 11.46 | 11.12, 11.12 | 13.12 | 13.04, 13.20 |

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only (C. H. Leigh-Dugmore, Rubber Age and Synthetics, November and December 1952) and forms cracks perpendicular to the direction of stretch, and such cracking can occur in the absence of light.

As a matter of fact, most commercial rubber antioxidants are without effect in inhibiting the deterioration caused by ozone.

Natural rubber is used in the manufacture of the sidewalls of tires. The cracking of such sidewalls has long been a problem. It is a primary object of this invention to provide antiozone agents which prevent such cracking. However, the antiozone agents of this invention are not limited to that use but may be employed in treads, thread and other latex products, and other rubber products.

The antiozone agents were tested in stock such as might be used in white sidewalls for tires. The control had the following formula and two parts of the various test materials were added to it. Any substantial small amount of antiozone agent may be employed, and this may vary, for example, from 0.2 part by weight to 10 parts by weight, depending upon the use to be made of the rubber vulcanizate.

| | Parts by weight |
|---|---|
| Natural rubber | 100 |
| White pigment and filler | 90.2 |
| Stearic acid | 1.2 |
| Sulfur | 3.0 |
| Accelerator | 0.9 |
| Total | 195.3 |

The results reported below include data on the tensile properties of the cured rubber stocks before and after aging two days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

After curing, the stocks were exposed to natural weathering for 62 days. The following table records when the first cracks were observed in each and also the size and number of the cracks in each of the samples on completion of the test:

| | | | | |
|---|---|---|---|---|
| Control | 195.3 | 195.3 | 195.3 | 195.3 |
| Acetyl N,N'-di-i-propylthiourea | | 2 | | |
| Acetyl N,N'-di-i-butylthiourea | | | 2 | |
| Acetyl N,N'-dicyclohexylthiourea | | | | 2 |
| Total | 195.3 | 197.3 | 197.3 | 197.3 |
| Normal Tensile Properties: | | | | |
| 400% Modulus | 1,075 | 1,075 | 1,125 | 1,025 |
| Tensile | 3,700 | 3,300 | 3,400 | 3,525 |
| Elongation | 660 | 600 | 600 | 620 |
| Aged 2 days at 212° F.: | | | | |
| 400% Modulus | 1,200 | 1,050 | 1,150 | 1,000 |
| Tensile | 2,400 | 2,000 | 2,200 | 2,375 |
| Elongation | 530 | 520 | 520 | 560 |
| Natural Weathering: | | | | |
| Days to Initial Cracking | 14 | 14 | 14 | 31 |
| Crack rating at 62 days— | | | | |
| Size | Severe | Moderate | Moderate | Slight Craze |
| Number | Numerous | Few | Few | No Cracks |

Each of the antiozone agents reduced the size of the cracks very materially. Also the number was decreased. In the test with acetyl N,N'-dicyclohexylthiourea, signs of incipient cracking appeared on the edges, where cracking has been found to be an inverse function of the sharpness of the die with which the dumbbell strips are cut.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e. g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, and xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vucanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

I claim:

1. A sulfur-vulcanized rubber composition which contains as an inhibitor of ozone cracking an acyl thiourea having the formula $$\text{R--N--C(S)--NHR}_1$$
$$\text{O\overset{|}{C}R}_2$$

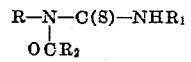

in which R and $R_1$ are from the class consisting of cyclopentyl, cyclohexyl, alkyl-substituted cyclopentyl, alkyl-substituted cyclohexyl and alkyl groups containing 1 to 9 carbon atoms, and $R_2$ is an alkyl group containing 1 to 5 carbon atoms.

2. The composition of claim 1 in which $R_2$ in the inhibitor is methyl.

3. The composition of claim 1 in which $R_2$ in the inhibitor is ethyl.

4. The composition of claim 1 in which $R_2$ in the inhibitor is propyl.

5. The composition of claim 1 in which $R_2$ in the inhibitor is butyl.

6. The composition of claim 1 in which the inhibitor is acetyl N,N'-di-i-propylthiourea.

7. The composition of claim 1 in which the inhibitor is acetyl N,N'-di-n-butylthiourea.

8. The composition of claim 1 in which the inhibitor is acetyl N,N'-dicyclohexylthiourea.

9. The method of vulcanizing rubber which comprises sulfur-vulcanizing the same in the presence of an acyl thiourea having the formula $$\text{R--N--C(S)--NHR}_1$$
$$\text{O\overset{|}{C}R}_2$$

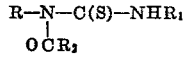

in which R and $R_1$ are from the class consisting of cyclopentyl, cyclohexyl, alkyl-substituted cyclopenyl, alkyl substituted cyclohexyl and alkyl groups containing 1 to 9 carbon atoms, and $R_2$ is an alkyl group containing 1 to 5 carbon atoms.

10. The method of claim 9 in which the acyl thiourea is an acetyl thiourea.

11. The method of claim 9 is which the acyl thiourea is acetyl N,N'-di-i-propylthiourea.

12. The method of claim 9 in which the acyl thiourea is acetyl N,N'-di-n-butylthiourea.

13. The method of claim 9 in which the acyl thiourea is acetyl N,N'-dicyclohexylthiourea.

References Cited in the file of this patent

UNITED STATES PATENTS

| | | |
|---|---|---|
| 2,483,576 | Vegvar | Oct. 4, 1949 |
| 2,647,935 | Beaver | Aug. 4, 1953 |
| 2,662,874 | Brown | Dec. 15, 1953 |
| 2,665,268 | Butler | Jan. 5, 1954 |
| 2,695,328 | Kendall | Nov. 23, 1954 |
| 2,698,300 | Hotten | Dec. 28, 1954 |
| 2,703,815 | Huebner | Mar. 8, 1955 |
| 2,714,613 | Huebner | Aug. 2, 1955 |

OTHER REFERENCES

Moore: Journal Am. Chem. Soc., 62, 3273–4 (1940).

U. S. DEPARTMENT OF COMMERCE
PATENT OFFICE

CERTIFICATE OF CORRECTION

Patent No. 2,822,412                     February 4, 1958

Joseph C. Ambelang

It is hereby certified that error appears in the printed specification of the above numbered patent requiring correction and that the said Letters Patent should read as corrected below.

Column 4, lines 73 and 74, for "cyclopenyl, alkyl substituted" read —cyclopentyl, alkyl-substituted—.

Signed and sealed this 1st day of April 1958.

(SEAL)
Attest:
KARL H. AXLINE
Attesting Officer

ROBERT C. WATSON
Commissioner of Patents